April 21, 1953  F. E. TUTTLE ET AL  2,635,374
CHANGEABLE DISPLAY APPARATUS
Filed May 27, 1950

FORDYCE E. TUTTLE
WILLIAM BORNEMANN
INVENTORS

BY Daniel J. Mayne
ATTORNEYS

Patented Apr. 21, 1953

2,635,374

UNITED STATES PATENT OFFICE 2,635,374

CHANGEABLE DISPLAY APPARATUS

Fordyce E. Tuttle and William Bornemann, Rochester, N. Y., assignors to Eastman Kodak Company, Rochester, N. Y., a corporation of New Jersey Application May 27, 1950, Serial No. 164,722

8 Claims. (Cl. 40—76)

The present invention relates to changeable display apparatus for use in advertising, and more particularly to an apparatus of this type which is viewed by transmitted light and by use of which the illusion of motion can be produced, as well as the successive display of different still subjects.

This invention is an improvement over the changeable display apparatus disclosed in copending patent application Serial No. 126,317, filed November 9, 1949, in the name of Miller R. Hutchison, Jr., assigned to the same assignee as this application, and is designed to overcome certain problems having to do with both the theoretical operation and mechanical details thereof which are of considerable magnitude. The display apparatus in question consists of a plurality of tubular electric lamps rotatably arranged in side-by-side relation in the form of a bank so as to be rotated in synchronism. Each lamp has arranged around its periphery a plurality of narrow picture elements extending longitudinally thereof which move substantially into and out of a picture plane when the lamps are rotated, and in which picture plane picture elements on the several tubes coact with one another to produce different pictures in succession when viewed through a slotted grid whose slits extend longitudinally of the lamps and which are substantially the same width as the picture elements on the sources.

One, and a preferred, way of placing these picture elements on the lamp peripheries is to cover the surface of each lamp while dark with a light-sensitive emulsion, exposing successive longitudinal segments of the peripheries of the emulsion to transverse portions of different pictures through the slits of a grid between each exposure, processing the emulsion to a transparency and replacing the lamps and/or transparencies behind the grid in the relation they were exposed and turning on the lamps and viewing them through the grid by transmitted light.

It will be appreciated that, in order to obtain satisfactory and coherent pictures, the picture elements on the lamps must be properly aligned with, and correspond to, the grid slits behind which they were exposed. This problem is not insurmountable if the picture elements are exposed and played back through the same grid, for then it is only necessary to number the corresponding lamps and grids to be sure each lamp is replaced behind the slot through which it was exposed.

However, when it is considered that sets of lamps, and/or individual replacement lamps, will logically be supplied to sign locations from a central source having master production equipment, the problems of lamp and grid registration will become apparent. If completely independent grids are used in both the signs and the master device, as contemplated in the above-noted copending application, it is almost certain that there will be a time distortion in any frame of any motion sequence when the lamps are installed in the final sign location. This will come about as follows. When a series of lamps are exposed behind a master grid, a picture element on any lamp, the coherent aggregate of which make up instantaneous time on the overall composite motion picture sign, will bear some fixed orientation to the bearings for the lamp and the slit of the grid through which it was exposed. In order that the phase for any instant over the complete motion picture frame (sign area) be constant, this exact slit, picture element, and lamp-bearing relationship must be reproduced exactly for every lamp when the set is installed in the sign. Assuming that the sign and master device have a fixed grid behind which the lamps are rotatably mounted in bearings, even if the sign grid corresponds exactly with the master grid, the bearings for the lamps in the sign would have to bear the same relation with the slits in the grid that the bearings in the master device bear with the slits in the master grid. Such an exact relationship is practically impossible to achieve, particularly when it is considered that these signs are shipped to location in a knocked-down condition and then erected. Any variation in this lamp-bearing and slit relationship between the sign and master device would probably be an increasing accumulative error which would mean that each grid slit at some particular instant would not be looking at its particular picture element of the coherent series of elements representing that instant over the sign face. Furthermore, if the master device of the same construction had an imperfect mechanical part orientation or an error that did not exactly match that of the signs into which the lamp sets were to be placed, a time phase error would occur over the face of the sign for every frame of the motion sequence and the picture would be hopelessly scrambled.

One object of the present invention is to provide a changeable display apparatus of the rotating lamp type which permits the lamps to be made at any central location and shipped to different sign locations and installed without any of the registration difficulties encountered in known apparatus of this type.

Another object is to provide each lamp with its own light shield and slit so that these so-called picture components can be stacked one above the other in side-by-side parallel relation to constitute a grid with rotatable lamps therebehind for both exposure and display purposes. Since each lamp and its slotted light shield is handled as a single component, it is impossible to get the picture elements on the lamp and their respective slits out of registration so as to cause a time phase error.

A further object is to provide a picture component for a display apparatus of the type described which comprises a tubular electric lamp rotatably mounted in a lamp shield having a slit through which picture elements on the lamp periphery can be viewed by transmitted light, said lamp having metal sleeves on opposite ends electrically connected to the terminals of the lamps and one of said sleeves having a driving gear fixed thereto. These components are adapted to be snapped into spring bearings on a sign support in stacked relation so that as a group their slotted shields form a grid through which the picture elements on a plurality of the lamps are viewed. Mounting of the components in the sign also automatically connects the driving gear thereon with a driving means on the sign so that the lamps can be rotated in synchronism. Mounting of the components on the sign also automatically connects the lamps to a power supply circuit.

And yet, another object is to provide a picture component of the type described in which the light shield for each lamp includes several different width slits which can be selectively used in accordance with the definition required in the portion of any picture that said component is to form a part.

And still another object is to provide means for mounting said picture components in a sign so that the individual components can be readily slipped into place or removed from the sign from the front without disturbing the other components.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings, in which Fig. 1 is a front elevational view on a greatly reduced scale showing a changeable display apparatus constructed in accordance with a preferred embodiment of the present invention;

Like reference characters refer to corresponding parts throughout the drawings.

Figure 1:
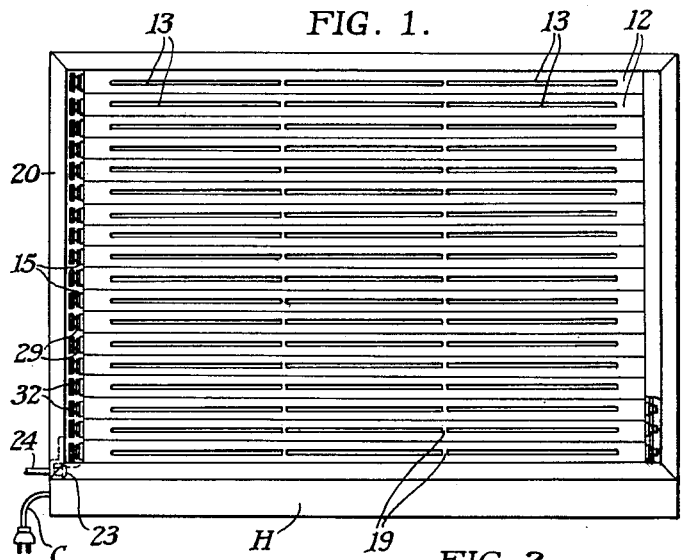
Figure 5:
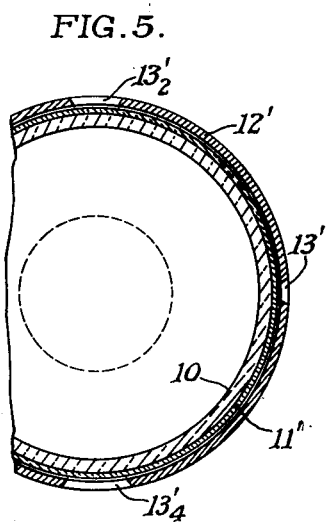
Fig. 5 is a partial enlarged vertical sectional view of a picture component having a cylindrical light shield.
Figure 4:
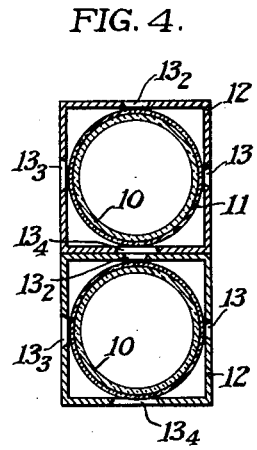
Fig. 4 is a vertical section showing two picture components having square light shields and showing how they would be stacked in the sign.
Figure 6:
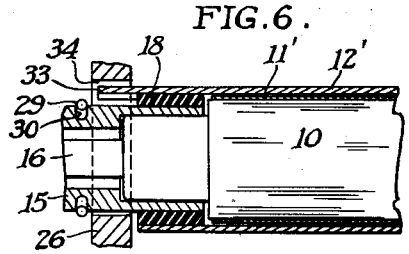
Fig. 6 is a detail showing how a component having a cylindrical light shield could be formed and mounted in a sign in order to hold the shield against rotation.

According to this invention, each picture component of the complete apparatus comprises a tubular electric lamp 10 which, for example, may be a fluorescent lamp, a neon lamp, etc., having its periphery covered with a light-sensitive emulsion or film 11. Encircling each lamp is a light shield which is preferably square, as shown at 12 in Fig. 4. This shield is mounted on the lamp so that the latter can rotate relative thereto as described hereinafter, and is of such dimension that the four walls thereof do not touch the emulsion or film on the surface of the lamp but are as close thereto as practically possible and still leave sufficient clearance so that the wall will not scrape the emulsion surface as the lamps are rotated within the shield. That portion of at least one wall of the shield, which is at the point of tangency with the lamp surface, includes a narrow slit 13 which extends longitudinally of the lamp over the entire length of the emulsion or film area. This slit in each of the shields forms the grid through which the picture is viewed when a series of components are stacked on top of one another in the sign, as indicated in Figs. 1 and 4. It is pointed out that these light shields could be any other suitable shape than square and, in Figs. 5 and 6, we have shown the shield 12' as being circular and provided with a longitudinally extending slit 13'. As before, the circular shield should be large enough in diameter to allow the lamp to rotate within it without the emulsion or film 11' being scraped, but should be as close to the emulsion as is practically possible.

Figure 2:
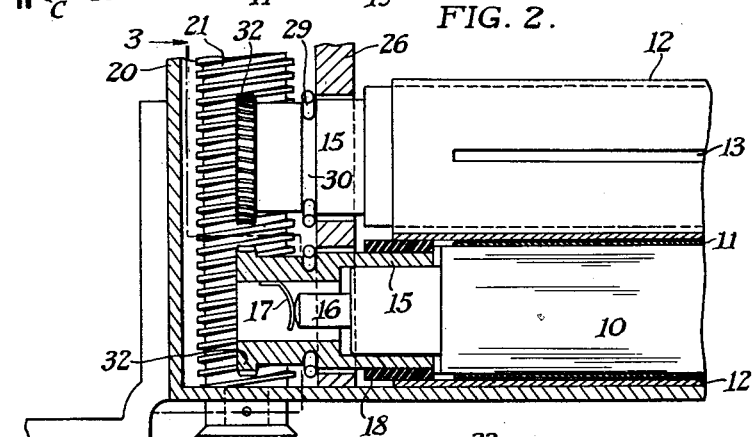
Fig. 2 is an enlarged view of the lower left-hand corner of the display apparatus shown in Fig. 1, partly in section and partly in elevation, and showing how the individual picture components are mounted in stacked relation in the sign.

Each end of the lamp has a metal sleeve 15 fixed thereon, and, in the present embodiment, each of these sleeves is electrically connected to the terminals 16 found on opposite ends of such lamps by a wire 17 soldered or otherwise connected to the two parts. As shown in Fig. 2, the light shield 12, which is usually metal, is then mounted at its ends on a collar 18 of insulating material encircling sleeves 15, the collar being thick enough to space the shield from the emulsion or film 11 on the lamp surface and permitting the lamp to rotate within the shield. In the event that the picture components are to form a part of a very large sign and are consequently so long that a continuous slit 13 would weaken the shield structure, ribs 19 may be left in the slotted wall of the shield as shown in Fig. 1, thus breaking each slit 13 up into a number of units. If these ribs 19 are made rather narrow and are sufficiently spaced apart, they will not be observed or detract in any way from the picture being displayed on the sign.

Figure 3:
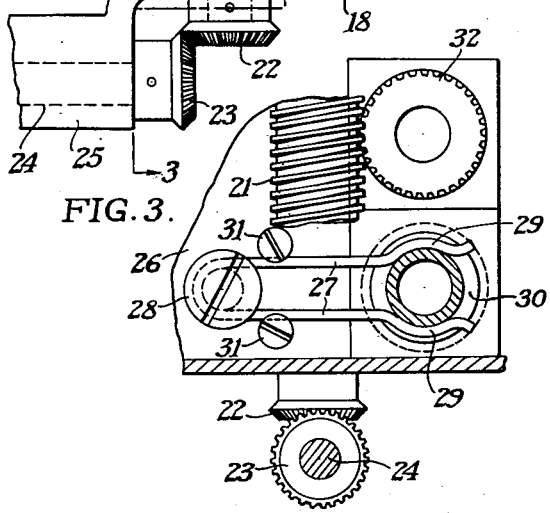
Fig. 3 is a sectional view taken substantially on line 3—3 of Fig. 2 and with the worm and worm wheel omitted to show the preferred form of bearing and electrical contact for one of the picture components.

The sign in which the described picture components are to be stacked for display purposes, and the master device in which said components are originally exposed, may be substantially the same in construction with the exception that in the master device there is no need for illuminating the lamps, and a preferred form of the same will now be described. Referring now to Figs. 1–3, the sign or master device may comprise a rectangular frame-like support 20 which is somewhat deeper than the thickness of the picture components. Extending along one vertical edge of the supporting frame is a worm 21 which is rotatably mounted in the top and bottom edges of the frame and has a beveled gear 22 fixed on its lower end. This beveled gear 22 is in turn engaged and driven by a second beveled gear 23 mounted on the end of a shaft 24 journaled in a bearing 25 which is fixed to the vertical edge of the frame 20 by welding or other suitable means. Shaft 24 and beveled gear 23 will be driven at any desirable speed from a motor and reduction gear combination not shown, or a manually operated indexing arrangement can be provided.

Extending between the top and bottom walls of the frame support 20 and disposed adjacent opposite vertical edges thereof are a pair of partitions 26 which are preferably made of an insulating material. Since the opposite ends of the picture components are mounted in the sign or the master device in precisely the same manner, only the mounting structure for one end thereof is shown in the drawings, it being understood that the mounting structure for the components, unless otherwise mentioned, will be duplicated at both ends of the sign and components. The bearings for the lamps of each picture component consist of U-shaped springs 27, each of which is held on the partitions 26 by a single screw 28. These bearings should be so mounted in vertical spaced relation on the partitions that the spring-bearing pivot points or screws 28 are equi-spaced along the partitions and each bears a definite relation with the slit 13 of the picture component it is to support.

The open end of each U-shaped spring 27 is provided with arcuate bearing portions 29 adapted to resiliently engage a correspondingly shaped circumferential groove 30 formed in the metal sleeves 15 on the lamp so as to rotatably support the lamp and position the same longitudinally of the sign. Opposite reaches of the bearing spring 27 may be confined by screws 31 in the partitions 26. For driving or rotating the lamps 10, a sleeve 15 at one end of the lamp, here shown as the left end, is provided with a worm wheel 32 which is adapted to be moved into driving engagement with the worm 21 when the picture components are snapped into place in the sign. The sleeve on the other end of the lamp, not shown, will not have a gear fastened thereto, but will have only a circumferential groove 30 adapted to be engaged by a U-shaped spring bearing 27 to rotatably support this end of the lamp, as indicated in Fig. 1.

When the lower picture component is slipped into position in the sign, one wall of its shield 12, if square, will engage the bottom edge of the support frame 20 and will thus be held against rotation. Then, as the subsequent picture components are slipped into place in stacked relation, the walls of their shields will engage one another so that they will all be held against rotation and with their slits 13 in proper location relative to the pivot points 28 of the U-shaped bearings 27. Should circular shields 12' be used on the lamps 10, they could be held against rotation when snapped into the sign by the arrangement shown in Fig. 6. Here we have shown one end of the circular shield 12' provided with a longitudinal extension 33 which is adapted to engage a notch 34 in one of the partitions 26 when the component is slipped into place in the sign.

So that the lamps 10 will be automatically connected into a suitable power supply when they are mounted in the sign, the spring bearings 27 along one partition 26 can be electrically connected into one side of the power supply and the spring bearings 27 along the other partition, not shown, will be connected into the other side of the power supply. Then, since metal sleeves 15 are electrically connected to opposite terminals of the lamps by wires 17, the lamps will be automatically connected into the power supply circuit when slipped into place in the sign. The power supply will vary depending upon the type of lamp being used. For instance, fluorescent lamps need a ballast for each one or two lamps, whereas neon lamps require a transformer. Since the power supply varies with the type of lamps used and form no part of our invention per se, we have not disclosed one specifically. The proper power supply could be mounted in a housing H mounted along the bottom edge of the sign, a cord C being provided for hooking it into a 110 or 220 A. C. line. It is pointed out that in the master device used for exposing the light-sensitive surface of the picture components, no provision for illuminating the lamps need be provided unless it is desired to use the device to finally inspect the finished components prior to their delivery to different sign locations.

In putting a series of pictures on these picture components, after the lamps are covered with a light-sensitive emulsion, or are wrapped with an unexposed light-sensitive film, they are covered with their respective light shields and inserted in stacked relation in a master device which is similar in construction to that described. Then, a series of pictures are exposed on the components through their slits by projecting an image on the front of the stacked components. The lamps are indexed after exposure to each picture of the desired series, and, after indexing, are subjected to another exposure of a different picture. After the desired series of pictures is exposed on the lamps, or when the entire periphery of each lamp is exposed, the shields are removed and the emulsion or the film is processed to a positive transparency. If a film is wrapped around each lamp, as shown, then corresponding films and lamps are numbered and indexed so that each film, after processing, can be returned to its own lamp and be indexed thereon so as to have the picture elements on the several lamps appear in the proper order and orientation as to time, so as to reproduce the pictures as exposed. Then the shields 12 are returned to the lamps and indexed relative thereto so that the slit 13 therein will line up with the picture elements on the lamp contained therein when the component is placed in the sign. This indexing of the shield relative to its lamp will probably have to be checked again at the time the components are placed in the sign, since they would probably have shifted relative one to another during shipment.

The very important result of this combination of lamp and its own light shield is the flexibility of slit arrangement it provides. Each of the four faces of the square light shield 12 can carry a slit of carefully selected different width as shown at $13_2$, $13_3$, and $13_4$ in Fig. 4. Likewise, a circular light shield would have different width slits 13', circumferentially spaced around its periphery as shown at $13'_2$, $13'_4$, in Fig. 5. This allows variable picture definition over the sign face and the change of that definition distribution as desired. Thus, one need not use definitions in any area of the sign which is greater than that needed to adequately reproduce the subject material of that area. Obviously, in those places where less definition or fewer picture elements are needed, titles, background, etc., the wider slits would provide greater light intensity. Very interesting display effects can be created by this variable intensity property. By far, the most important result, however, is that one need not use any greater definition than is required for the particular subject material as a whole or in part.

It will be appreciated that by providing each lamp with its own slotted light shield, each slit will always bear a fixed positional relation to the series of picture elements on its lamp and this relation cannot be changed regardless of any positional errors of parts of the sign in which the lamp is to be mounted. This assumes, of course, that when a picture component is placed in a sign, a zero setting can be made; that is, all slits over the sign face can be adjusted relative to their own lamps so as to be looking at coherent picture elements on the respective lamps at any one instant. This is possible because the lamps can be rotated relative to their shields and the exposures thereon will probably be numbered in the order in which they were exposed. This construction completely eliminates any time phase error, since the relation of any slit width with respect to its series of pictures is determined by its own light shield, rather than by the position of the lamp-bearing in the sign or a complete fixed slotted grid in the sign. Since the shield slits and the picture elements of each picture component are substantially in contact, all parallax errors are eliminated. Such errors in conventional fixed grid sign constructions would be apparent as time phase differences over the sign surface, or in still pictures, the mixture of parts of one picture with parts of another.

Further advantages derived from this invention include easy picture component replacement from the front of the sign which is a "must," since most signs are placed against buildings. It completely eliminates the necessity for any bearing support in the center of long lamps and makes weatherproofing a much simpler task. The slits 13 in the shields can be filled with a transparent plastic material, thus protecting the film surface from weather damage. The ends of the picture components, after being mounted in the sign, would ordinarily be protected with a suitable cover plate, rather than being exposed, as shown in Fig. 1 for purposes of illustrating the manner of mounting the components in the sign. All parts can have extremely wide tolerances and yet not affect the exact registration this arrangement provides. Any definition error introduced by random errors in the stacking of the picture components is, of course, of no consequence, since it is not a time phase error.

Although we have shown and described certain specific embodiments of our invention, we are fully aware that many modifications thereof are possible. Our invention, therefore, is not to be limited to the specific details of construction shown and described, but is intended to cover all modifications coming within the scope of the appended claims.

Having thus described our invention, what we claim is new and desire to secure by Letters Patent of the United States is:

1. A changeable display apparatus comprising in combination a substantially rectangular support, driving means on said support and extending along one edge thereof; a plurality of tubular electric lamps rotatably disposed on said support in a bank in side-by-side parallel relation so that all portions of the periphery of each lamp move substantially into and out of a common picture plane as the lamps are rotated; the periphery of each lamp provided with a plurality of individual elongated light-transmitting picture elements extending longitudinally and disposed circumferentially thereof, and the picture elements on the several lamps arranged to coact with one another in the picture plane upon rotation of the lamps to produce different pictures in succession; a driving member fixed to one end of each lamp; bearings on said support for rotatably mounting and axially positioning said lamps on the support with the driving members thereof in driving engagement with said driving means; and a light shield carried by and encircling each lamp and mounted thereon to permit the lamp to rotate relative thereto, the wall of each shield including a portion lying substantially in said picture plane and being substantially in contact with the periphery of the lamp contained therein, said wall portion provided with an elongated slit substantially equal in width and length to the picture elements on its lamp.

2. A changeable display apparatus according to claim 1, characterized by the fact that said bearings for each lamp are fixedly mounted in pairs, one on the edge of the support including said driving means and the other on the opposite parallel edge, said bearings adapted to be opened so that the lamps can be readily slipped into and out of engagement therewith from the front of the support by lateral movement of the lamps in a direction radially of the bearings.

3. A changeable display apparatus according to claim 1, characterized by the fact that said driving means on the support is a worm, the driving member fixed to one end of each lamp is a worm wheel, and said bearings on the support can be opened to permit said lamps to be readily slipped into and out of engagement therewith from the front of the support by lateral movement of the lamps in a direction radially of the bearings and whereby the worm wheel on the lamp is moved into driving engagement with the worm when the lamp is slipped into its bearings.

4. A changeable display apparatus according to claim 1, characterized by the fact that a metal sleeve is fixed on the opposite end of each lamp, a circumferential groove in each of said sleeves, said driving member comprising a gear fixed to one of said metal sleeves, and said bearings comprising a pair of arcuately shaped shoes complementary in cross section to said circumferential grooves so as to engage the same and locate the lamps axially as well as for rotation, means urging said shoes toward one another to grip the lamp sleeve when disposed therebetween, the ends of said shoes being separated and formed so that the lamps may be snapped readily into position in said bearings.

5. A picture component for use in a changeable display apparatus of the type described comprising an elongated tubular electric lamp whose periphery is covered by a light-sensitive emulsion, a light shield carried by and encircling said lamp and mounted thereon to permit the lamp to rotate relative thereto, a longitudinal portion of the wall of said shield being substantially in contact with said emulsion layer on the periphery of said lamp, said wall portion being provided with an elongated narrow slit extending longitudinally of said lamp through which the emulsion on said lamp may be exposed to light when the lamp is dark and through which the emulsion can be subsequently viewed by transmitted light after exposure and processing and when the lamp is lighted.

6. A picture component for use in a changeable display apparatus of the type described comprising an elongated tubular electric lamp whose periphery is covered by a light-sensitive emulsion; a light shield carried by and encircling said lamp and mounted thereon to permit the lamp to rotate relative thereto; longitudinal portions of the wall of said shield, at points spaced circumferentially of said lamp, being substantially in contact with the emulsion layer on the periphery of said lamp; each of said wall portions being provided with an elongated narrow slit extending longitudinally of said lamp and through which the emulsion on the lamp may be exposed to light when the lamp is dark and through which the emulsion may be subsequently viewed by transmitted light from the lamp when lighted after exposure and processing to a transparency; each of said slits being of a different width for selective use in exposing and viewing said lamps in accordance with the definition of that part of a complete picture said component is to depict.

7. A changeable display apparatus comprising in combination a substantially rectangular support, driving means on said support and extending along one edge thereof; a plurality of tubular electric lamps having contact terminals at opposite ends rotatably disposed on said support in side-by-side parallel relation so that all portions of the periphery of each lamp move substantially into and out of a common picture plane as the lamps are rotated; the periphery of each lamp provided with a plurality of individual elongated light-transmitting picture elements extending longitudinally and disposed circumferentially thereof, and the picture elements on the several lamps arranged to coact with one another in the picture plane upon rotation of the lamps to produce different pictures in succession, a metal sleeve fixed to each end of said lamp and electrically connected to the terminal at its end of the lamp, a driven member fixed to one of said metal sleeves; metal bearings spaced along opposite edges of said support into which the metal sleeves on the ends of the lamps are adapted to be snapped radially so as to rotatably support and axially position said lamps on said support with the driven member in driving engagement with the driving means on the support; the bearings on one side of said support being electrically connected to one side of a supply circuit for said lamps and the bearings on the other side of the support electrically connected to the other side of the supply circuit, whereby the lamps are connected into said supply circuit when inserted into said bearings, and a light shield carried by and encircling each lamp and mounted thereon to permit the lamp to rotate relative thereto, the wall of each shield provided with an elongated slit extending longitudinally of said lamp and substantially equal in width and length to the picture elements on its lamp.

8. A picture component for use in a changeable display apparatus of the type described comprising a tubular electric lamp whose periphery is provided with a plurality of individual elongated light transmitting picture elements extending longitudinally and disposed circumferentially thereof, a light shield carried by and encircling said lamp and mounted thereon to permit the lamp to rotate relative thereto, the wall of said shield including a portion substantially in contact with the periphery of the lamp contained therein, said wall portion provided with an elongated slit extending longitudinally of said lamp and being substantially equal in width and length to the picture elements on the lamp, a metal sleeve fixed to each end of said lamp, an electrical connection between each sleeve and the contact on the end of the lamp engaged thereby, and a gear fixed to one of said sleeves.

FORDYCE E. TUTTLE.
WILLIAM BORNEMANN.

References Cited in the file of this patent

UNITED STATES PATENTS

| Number | Name | Date |
|---|---|---|
| 1,173,361 | Lean | Feb. 29, 1916 |
| 1,823,075 | Wilson | Sept. 15, 1931 |
| 2,293,185 | Wolfson | Aug. 18, 1942 |
| 2,482,886 | Van Gieson | Sept. 27, 1949 |

FOREIGN PATENTS

| Number | Country | Date |
|---|---|---|
| 805,850 | France | Sept. 7, 1936 |